(12) United States Patent
Windeballe et al.

(10) Patent No.: US 10,212,834 B2
(45) Date of Patent: Feb. 19, 2019

(54) APPARATUS AND METHODS OF FORMING MOLDED PARTS

(75) Inventors: Lars Stendevad Windeballe, Virum (DK); Christian Saxe, Copenhagen East (DK); Mark Newman, Hilleroed (DK); Jacob Stage, Frederiksberg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/348,139

(22) PCT Filed: Sep. 28, 2011

(86) PCT No.: PCT/IB2011/054273
§ 371 (c)(1),
(2), (4) Date: Mar. 28, 2014

(87) PCT Pub. No.: WO2013/045977
PCT Pub. Date: Apr. 4, 2013

(65) Prior Publication Data
US 2014/0246965 A1   Sep. 4, 2014

(51) Int. Cl.
| H05K 5/02 | (2006.01) |
| G06F 1/16 | (2006.01) |
| B29C 45/16 | (2006.01) |
| H04M 1/02 | (2006.01) |
| B29L 31/34 | (2006.01) |

(52) U.S. Cl.
CPC ............. *H05K 5/02* (2013.01); *B29C 45/16* (2013.01); *G06F 1/1656* (2013.01); *H04M 1/0202* (2013.01); *H04M 1/0252* (2013.01); *B29L 2031/3481* (2013.01)

(58) Field of Classification Search
CPC ............. H04M 1/0202; H04M 1/0206; H04M 1/0208; H04M 1/0247; H04M 1/0249; H04M 1/0252; B29L 2031/3437; B29L 2031/3481; H05K 5/02; B29C 45/16; G06F 1/1656
USPC ..................... 455/575.1, 575.3, 575.4, 556.2
See application file for complete search history.

(56) References Cited

U.S. PATENT DOCUMENTS

| 5,655,018 A | 8/1997 | Estevez-Alcolado de Holl et al. ............................ 379/433 |
| 6,333,716 B1 | 12/2001 | Pontoppidan ................. 343/702 |
| 6,359,787 B1 | 3/2002 | Peltolehto et al. ........... 361/752 |

(Continued)

FOREIGN PATENT DOCUMENTS

| EP | 1 956 681 A1 | 8/2008 |
| GB | 2 379 184 A | 3/2003 |

(Continued)

OTHER PUBLICATIONS

Photograph of PDC800 diversity antenna used in Nokia HD925 mobile phone in Japan, 1 page, 1999.

(Continued)

*Primary Examiner* — Patrick D Hawn
(74) *Attorney, Agent, or Firm* — Alston & Bird LLP (57) ABSTRACT

Various embodiments may relate to an apparatus including a first molded part including a first portion extending along a first axis, and a second portion extending along a second axis having a different orientation to the first axis; and a second molded part, molded to the first molded part, and including a third portion positioned adjacent the first portion and defining a gap there between.

23 Claims, 5 Drawing Sheets

(56) References Cited

U.S. PATENT DOCUMENTS

| | | | |
|---|---|---|---|
| 6,375,026 B1* | 4/2002 | Sheldrake | H04M 1/0249 220/4.02 |
| 6,480,397 B1* | 11/2002 | Hsu | H04B 1/3833 361/752 |
| 6,950,516 B2* | 9/2005 | Pirila | B29C 45/1676 379/433.12 |
| 2003/0174092 A1 | 9/2003 | Sullivan et al. | 343/702 |
| 2004/0056804 A1 | 3/2004 | Kadambi et al. | 343/700 MS |
| 2004/0203488 A1 | 10/2004 | Sullivan et al. | 455/90.1 |
| 2005/0024270 A1* | 2/2005 | Zheng | H01Q 1/243 343/702 |
| 2009/0317993 A1 | 12/2009 | Komiyama | |
| 2011/0043413 A1 | 2/2011 | Zadesky | |
| 2011/0133409 A1 | 6/2011 | Shibuya | 277/312 |

FOREIGN PATENT DOCUMENTS

| | | |
|---|---|---|
| WO | WO 03/001355 A1 | 1/2003 |
| WO | WO 2005/069432 A1 | 7/2005 |
| WO | WO 2013/034956 A1 | 3/2013 |

OTHER PUBLICATIONS

International Search Report and Written Opinion for Application No. PCT/IB2011/054273 dated May 24, 2012 pp. 1-15.

\* cited by examiner

APPARATUS AND METHODS OF FORMING MOLDED PARTS

TECHNOLOGICAL FIELD

Embodiments of the present invention relate to apparatus and methods of forming molded parts. In particular, they relate to apparatus in hand portable electronic devices.

BACKGROUND

Apparatus, such as portable electronic communication devices, usually comprise a housing that houses the electronic components of the apparatus. The housing may include a plurality of cover parts that are joined together via an adhesive such as glue. However, the process of forming the housing may be relatively complex and costly due to the use of jigs for adhering the cover parts together.

It would therefore be desirable to provide an alternative apparatus.

BRIEF SUMMARY

According to various, but not necessarily all, embodiments of the invention there is provided an apparatus comprising: a first molded part including a first portion extending along a first axis, and a second portion extending along a second axis having a different orientation to the first axis; and a second molded part, molded to the first molded part, and including a third portion positioned adjacent the first portion and defining a gap there between.

The first portion and the second portion may define a recess. The third portion may extend across the recess.

The recess may be elongated and may extend along an axis having an orientation different to the first axis.

The third portion may at least partially obstruct the recess.

The first molded part may include one or more guide portions configured to enable the first molded part to be positioned in an injection molding apparatus at a predetermined position and receive the second molded part.

The one or more guide portions may comprise guide apertures for enabling the first molded part to be positioned in the injection molding apparatus at the predetermined position.

The first molded part and the second molded part may comprise different materials.

The first molded part may be configured to define an exterior surface of an electronic device, and the second molded part may be configured to define an interior surface of the electronic device.

The third portion may be configured to receive a fastener or may be a reinforcement member.

According to various, but not necessarily all, embodiments of the invention there is provided an electronic device comprising an apparatus as described in any of the preceding paragraphs.

According to various, but not necessarily all, embodiments of the invention there is provided a method comprising: molding a first molded part including a first portion extending along a first axis, and a second portion extending along a second axis having a different orientation to the first axis; and molding a second molded part to the first molded part, the second molded part including a third portion positioned adjacent the first portion and defining a gap there between.

The first portion and the second portion may define a recess. The third portion may extend across the recess.

The recess may be elongated and may extend along an axis having an orientation different to the first axis.

The third portion may at least partially obstruct the recess.

The first molded part may include one or more guide portions configured to enable the first molded part to be positioned in an injection molding apparatus at a predetermined position and receive the second molded part.

The one or more guide portions may comprise guide apertures for enabling the first molded part to be positioned in the injection molding apparatus at the predetermined position.

The first molded part and the second molded part may comprise different materials.

The first molded part may be configured to define an exterior surface of an electronic device, and the second molded part may be configured to define an interior surface of the electronic device.

The third portion may be configured to receive a fastener or may be a reinforcement member.

BRIEF DESCRIPTION

For a better understanding of various examples of embodiments of the present invention reference will now be made by way of example only to the accompanying drawings in which.

DETAILED DESCRIPTION

In the following description, the wording 'connect' and 'couple' and their derivatives mean operationally connected or coupled. It should be appreciated that any number or combination of intervening components can exist (including no intervening components).

Figure 1:
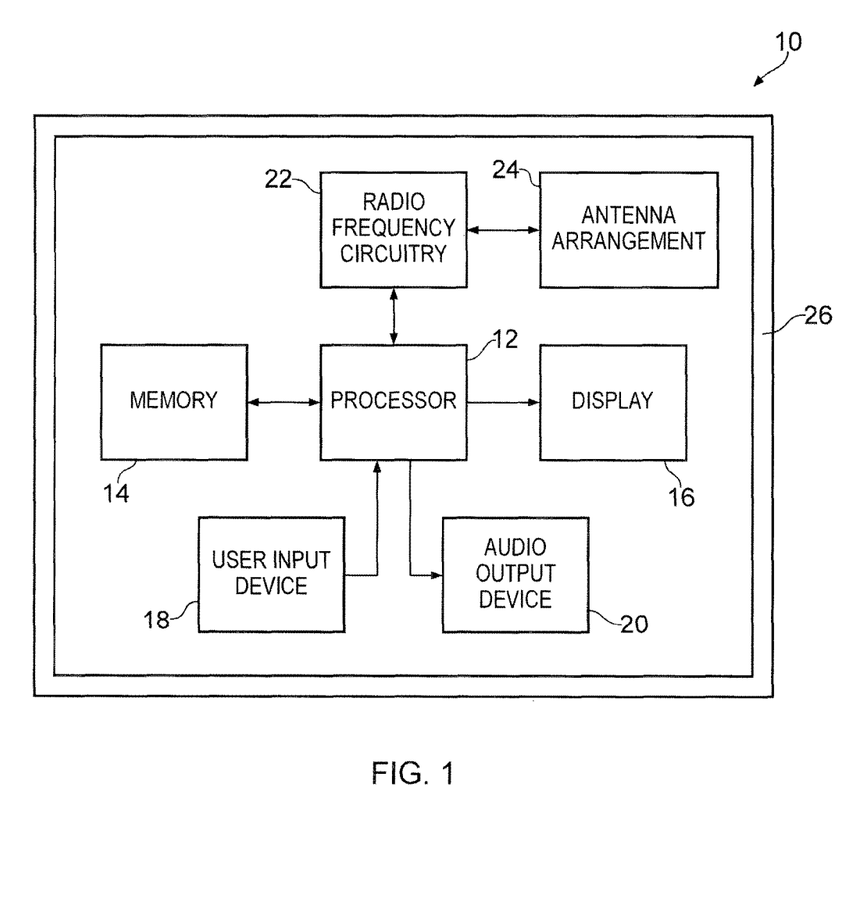
FIG. 1 illustrates a schematic diagram of an electronic device according to various embodiments of the present invention.

FIG. 1 illustrates an electronic device 10 which may be any apparatus such as a portable electronic device (for example, a mobile cellular telephone, a tablet computer, a laptop computer, a personal digital assistant or a hand held computer), a non-portable electronic device (for example, a personal computer or a base station for a cellular network), a portable multimedia device (for example, a music player, a video player, a game console and so on) or a module for such devices. As used here, 'module' refers to a unit or apparatus that excludes certain parts or components that would be added by an end manufacturer or a user.

The electronic device 10 may comprise one or more processors 12, one or more memories 14, a display 16, a user input device 18 (such as a keypad), an audio output device 20 (such as a loudspeaker), radio frequency circuitry 22

(such as a transmitter, a receiver and/or a transceiver), an antenna arrangement 24 and a housing 26. It should be appreciated that different electronic devices may have different electronic components and that some of the above mentioned components may not be included in some devices. For example, a personal computer may not include the radio frequency circuitry 22 and the antenna arrangement 24 in some embodiments.

The housing 26 is configured to house at least some of the electronic components of the device 10 and may therefore provide an exterior surface of the electronic device 10. The housing 26 includes two or more cover parts which may be fastened to one another to conceal the electronic components of the device 10.

Figure 2A:
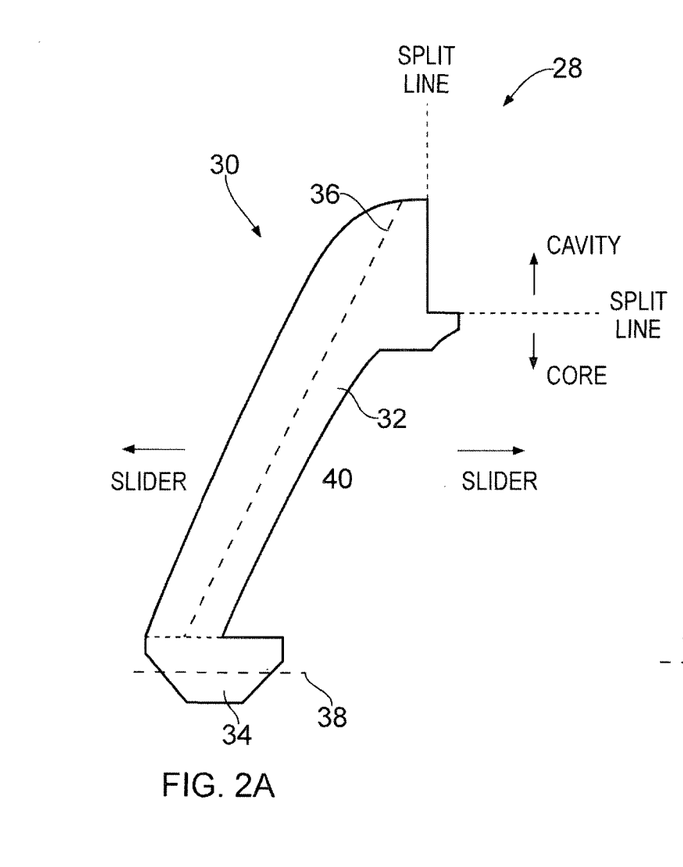
FIG. 2A illustrates a schematic diagram of a first molded part of an apparatus according to various embodiments of the present invention.

FIG. 2A illustrates a schematic diagram of a first molded part 30 of an apparatus 28 according to various embodiments of the present invention. The apparatus 28 may be any molded part of the electronic device 10 and may be part of the housing 26 or a structure internal to the device 10.

The first molded part 30 includes a first portion 32 and a second portion 34 that define a recess 40. The first portion 32 extends along a first axis 36 and the second portion 34 extends from a bottom end of the first portion 32 along a second axis 38 that is oriented in a different direction to the first axis 36.

Figure 3:
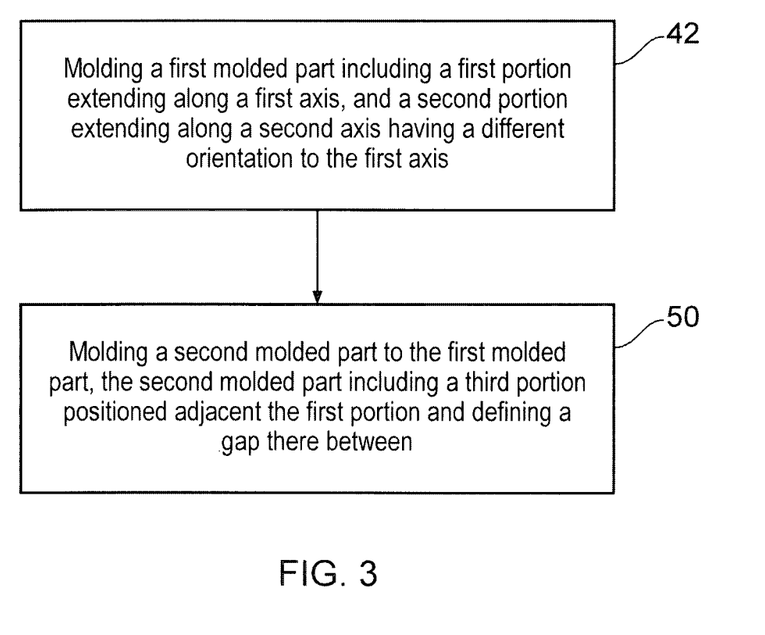
FIG. 3 illustrates a flow diagram of a method of forming an apparatus according to various embodiments of the present invention.

With reference to FIG. 3, the first molded part 30 is formed in a first shot (block 42) of a two shot injection molding process. At block 42, the method includes molding the first molded part 30 including the first portion 32 and the second portion 34. In more detail, the first molded part 30 is formed in a first mold tool cavity between a core and a cavity which are moveable in the vertical direction and at least one slider which is moveable in the horizontal direction.

Figure 2B:
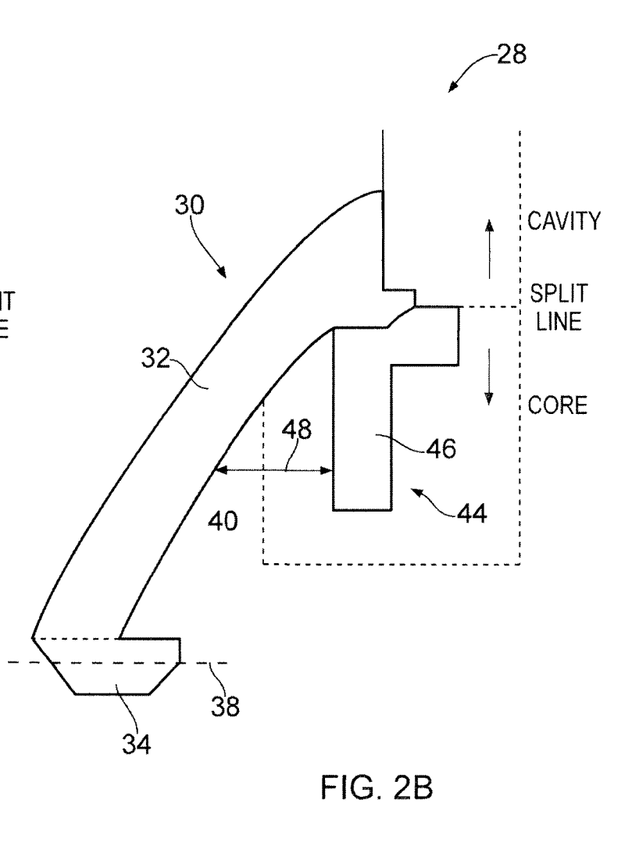
FIG. 2B illustrates a schematic diagram of the first molded part illustrated in FIG. 2A and a second molded part according to various embodiments of the invention.

It should be appreciated that the first portion 32 and the second portion 34 are molded in the same shot and are therefore integral with one another and do not have a joining interface (the dotted line in FIGS. 2A and 2B being provided for visualization purposes only).

FIG. 2B illustrates a schematic diagram of the first molded part 30 illustrated in FIG. 2A and a second molded part 44 according to various embodiments of the invention.

The second molded part 44 is molded to a top end of the first molded part 30 and includes a third portion 46 which is positioned adjacent the first portion 32. The first portion 32 and the third portion 46 are separated from one another and a gap 48 is defined between them. The third portion 46 extends across the recess 40 defined between the first portion 32 and the second portion 34 and thereby at least partially obstructs the recess 40. In this embodiment, the third portion 46 extends from the top end of the first portion 32 into the recess 40 and in a direction that is substantially perpendicular to the second axis 38.

The first molded part 30 and the second molded part 44 may comprise different materials in various embodiments or may comprise the same materials in other embodiments. For example, the first molded part 30 may comprise a polycarbonate (PC) and glass, and the second molded part 44 may comprise a polycarbonate (PC) or acrylonitrile butadiene styrene (ABS).

With reference to FIG. 3, the second molded part 44 is formed in a second shot (block 50) of the two shot injection molding process. At block 50, the method includes molding the second molded part 44 to the first molded part 30. In more detail, the first molded part 30 is removed from the first mold tool cavity and then placed in a second mold tool cavity (which is different to the first mold tool cavity). The second molded part 44 is then molded locally at the top end of the first portion 32 between a core and a cavity which are moveable in the vertical direction.

Figure 4A:
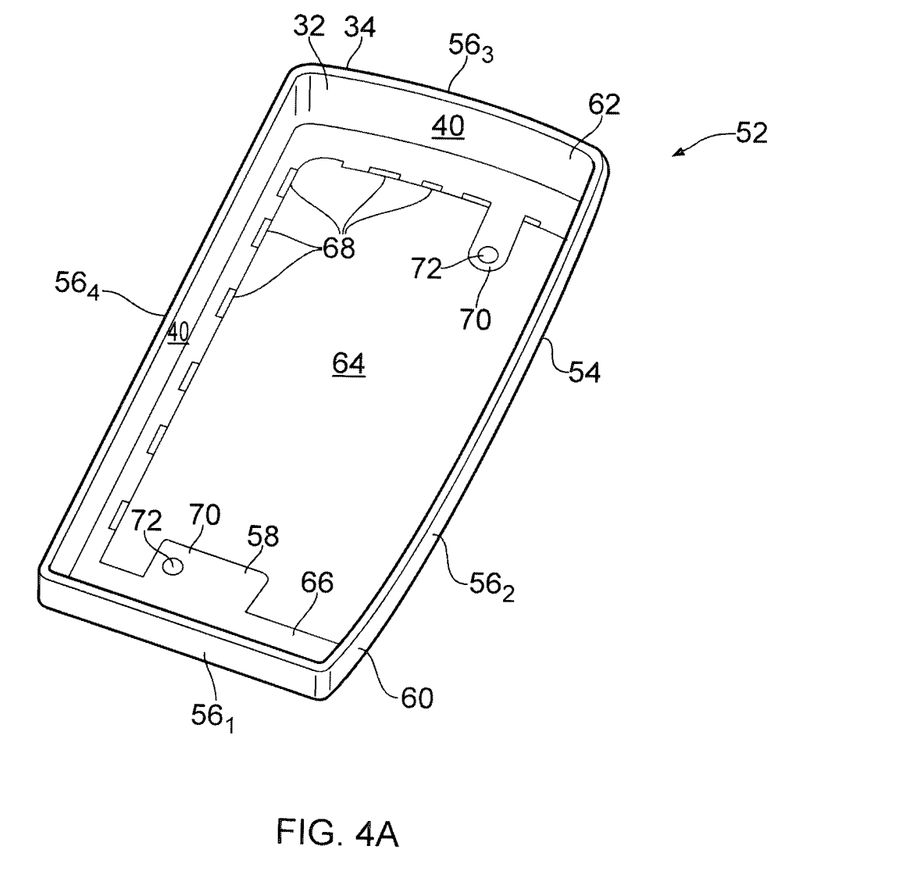
FIG. 4A illustrates a perspective view of a first molded part of another apparatus according to various embodiments of the present invention.

FIG. 4A illustrates a perspective view of a first molded part 54 of another apparatus 52 according to various embodiments of the present invention. The apparatus 52 is similar to the apparatus 28 illustrated in FIGS. 2A & 2B and where the features are similar, the same reference numerals are used. Furthermore, it should be appreciated that block 42 of the method illustrated in FIG. 3 may be performed to mold the first molded part 54.

The apparatus 52 is a front cover of a portable electronic device such as a mobile cellular telephone. That is, the apparatus 52 forms the cover that usually faces the user when the user is operating the portable electronic device. The first molded part 54 is substantially rectangular in shape and includes four side walls $56_1$, $56_2$, $56_3$ and $56_4$ that define the perimeter of the front cover and a front wall 58 that provides at least part of the front surface of the device.

The side walls 56 have a cross sectional shape that is similar to the shape of the first molded part illustrated in FIGS. 2A and 2B and the first portion 32 provides the side wall and the second portion 34 provides an undercut of the side wall. The outer surfaces of the side walls 56 (for example, surface 60 on the side wall $56_2$) provide exterior surfaces of the front cover and hence exterior surfaces of the electronic device 10. The inner surfaces of the side walls 56 (for example, surface 62 on the side wall $56_3$) provide interior surfaces of the front cover and are not visible to a user when operating the electronic device 10.

In this embodiment, the first portions 32 and second portions 34 of the side walls 56 define recesses 40 that are elongated and extend along axes which are perpendicular to the first axis of the first portion 32.

The front wall 58 extends inwards perpendicularly from the side walls 56 and defines an aperture 64. In some embodiments, the front wall 58 may extend inwards by a pre-defined angle, other than a perpendicular angle, from the side walls 56. The front face 58 has a first surface (not illustrated in this figure) that provides an exterior surface of the front cover and a second surface 66 that provides an interior surface of the front cover.

The front wall 58 includes a plurality of sections 68 that are thinner than the remainder of the front wall 58 and are configured to increase the strength of the interconnection between the first molded part and a second molded part which is molded to the first molded part along the sections 68.

The front wall 58 also includes guide portions 70 that are configured to enable the first molded part 54 to be positioned in an injection molding apparatus at a predetermined position for receiving a second molded part. The one or more guide portions 70 comprise guide apertures 72 for receiving protrusions of a second mold tool cavity that enable the first molded part 54 to be positioned in the second mold tool cavity at the predetermined position.

Figure 4B:
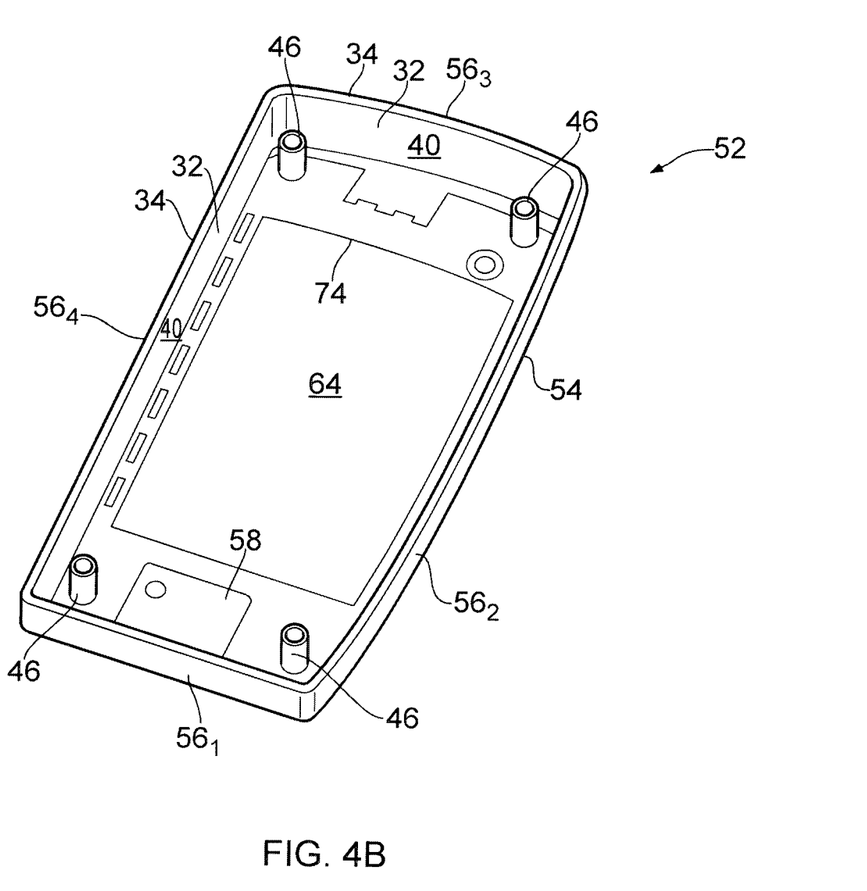
FIG. 4B illustrates a perspective view of the first molded part illustrated in FIG. 4A and a second molded part according to various embodiments of the present invention.

FIG. 4B illustrates a perspective view of the first molded part 54 illustrated in FIG. 4A and a second molded part 74 according to various embodiments of the present invention. Once again, it should be appreciated that block 50 of the method illustrated in FIG. 3 may be performed to mold the second molded part 74 to the first molded part 54.

The second molded part 74 is molded to the first portions 32 of the side walls 56 and to the front wall 58 and forms an interior surface of the front cover 52. The second molded part 74 includes four third portions 46 that are positioned at the corners defined by the side walls 56 of the first molded part 54. In this embodiment, the third portions 46 are configured to receive fasteners (for example, they may be screw bosses) for securing another component of the device 10 to the front cover 52. In other embodiments, the third portions 46 may alternatively or additionally include reinforcement members (such as a reinforcement rib) for physically strengthening the device 10, hooks, guides, walls and/or guide pins and so on. As illustrated in FIG. 4B, the third protrusions extend across the recesses 40 and obstruct the recesses 40.

Embodiments of the present invention provide several advantages. Firstly, the apparatus 28 and 52 are complex objects that may not be made by known 2-shot molding techniques. One current way that these complex objects can be made is by molding each sub-part separately using standard mold tools (not 2-shot) and then adhering the two sub-parts together to form a unitary part or object. This is a time consuming and costly process. It should be appreciated that the first, second and third portions 32, 34, 46 of the apparatus 28, 52 may not be made by known 2-shot molding techniques because their arrangement obstructs the movement of the molding tool components. For example, the second portion 34 may be considered as an undercut that requires a slider in order to be molded. However, the positioning of the third portion 46 would obstruct the sideways movement of that slider. Furthermore, it is not possible to move the slider downwards since this direction is obstructed by the second portion 34.

The molding technique illustrated in FIG. 3 (which may be referred to as 'undermolding') provides an advantage in that the second molded part is molded in a separate mold tool cavity to the first molded part and is molded around a portion of the first molded part. This technique allows the molding tool components to be removed from the apparatus 28, 52 after the second molded part has been molded.

Secondly, the first molded part 30, 54 and the second molded part 44, 74 are molded together in a two shot molding process and advantageously, no adhesive (such as glue) is required for coupling the first molded part 30, 54 and the second molded part 44, 74 together. Since the first and second molded parts are not joined via an adhesive, the apparatus 28, 52 may be stronger and coupled together more accurately than an apparatus coupled by adhesive. Furthermore, the molding process illustrated in FIG. 3 does not require a jig for gluing the first and second molded parts together and may therefore be less costly than a process that requires a jig.

Thirdly, the guide portions 70 may advantageously enable the second molded part to be accurately molded to the first molded part and this may increase the consistency of apparatus molded in accordance with the method illustrated in FIG. 3.

Fourthly, the exterior surface of the first molded part 30, 54 may be of relatively high quality since the second molded part 44, 74 may be molded to a localized area of the interior surface of the first molded part 30, 54. This is achieved by only providing the interior surface of the first molded part 30, 54 to be accessible by the mold cavity for the second shot. Therefore the exterior surface is not subjected to being placed inside a mold tool cavity during molding of the second shot. Furthermore, since structural features may be molded in the second molded part 44, 74, the first molded part 30, 54 may be molded with a substantially uniform thickness and this may reduce or eliminate sink marks in the first molded part 30, 54.

The blocks illustrated in the FIG. 3 may represent steps in a method and/or sections of code in a computer program. One or more processors of a manufacturing apparatus may read the computer program and control machinery to perform the blocks in FIG. 3. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A housing for a portable electronic device comprising a first part and a second part coupled together using a two shot injection molding process;

the first part including a front wall portion of the housing, a side wall of the housing and an undercut of the side wall, the front wall portion is on a top side of the first part, the undercut of the side wall is on a bottom side of the first part, and the side wall is between the top side and the bottom side, the front wall portion extending away from a top end of the side wall at a pre-defined angle so as to define an aperture in the top side of the first part, the front wall portion also defining a plurality of thicker and thinner sections along at least two sides of the aperture, the front wall portion also comprising one or more guide portions configured to protrude beyond other portions of the front wall portion so as to extend into the aperture and to enable the first part to be positioned in an injection molding apparatus at a pre-determined position and receive the second part, the undercut of the side wall extending away from a bottom end of the side wall at another angle, the side wall and the undercut of the side wall define an undercut volume; and the second part, which is molded to at least part of the front wall portion of the first part, including a protrusion adjacent to the side wall and defining a gap between the protrusion and the side wall, the protrusion extending in a direction from the top side of the first part towards the bottom side of the first part.

2. An apparatus as claimed in claim 1, wherein the undercut volume is defined by an inside surface of the side wall and an underside surface of the undercut of the side wall, which is extending away from the side wall.

3. An apparatus as claimed in claim 1, wherein the one or more guide portions extend further away from the top end than other portions of the first part.

4. An apparatus as claimed in claim 1, wherein the one or more guide portions comprise guide apertures for enabling the first part to be positioned in the injection molding apparatus at the predetermined position.

5. An apparatus as claimed in claim 1, wherein the first part and the second part comprise different materials.

6. An apparatus as claimed in claim 1, wherein the first part is configured to define an exterior surface of an electronic device, and the second part is configured to define an interior surface of the electronic device.

7. An apparatus as claimed in claim 1, wherein the protrusion is configured to receive a fastener or is a reinforcement member.

8. An electronic device comprising a housing as claimed in claim 1.

9. A housing as claimed in claim 1, wherein the front wall portion comprises two guide portions that extend into the aperture from opposite sides of the aperture.

10. A housing as claimed in claim 1, wherein the second part comprises a plurality of protrusions located proximate corners of the housing.

11. A housing as claimed in claim 1, wherein the protrusion has a cylindrical shape.

12. A two shot injection molding method for a housing of a portable electronic device, the method comprising:
  in first shot, molding a first part using a first mold cavity and mold core with a slider, the first part including a front wall portion, a side wall and an undercut of the side wall, the front wall portion is on a top side of the first part, the undercut of the side wall is on a bottom side of the first part, and the side wall is between the top side and the bottom side, the front wall portion extending away from a top end of the side wall at a pre-defined angle, the undercut of the side wall extending away from a bottom end of the side wall at another angle, the side wall and the undercut of the side wall define an undercut volume molded by the slider movable in a horizontal direction to and from the side wall; and
  in a second shot after removing the first part from the first mold cavity, molding a second part to at least part of the front wall portion of the first part using a second mold cavity, different than the first mold cavity, with the second part molded between another mold core and a cavity movable in a vertical direction, the second part including a protrusion adjacent to the side wall and defining a gap between the protrusion and the side wall, and the protrusion extending towards the bottom side of the first part so as to extend at least partially across the undercut volume, thereby at least partially obstructing the undercut volume.

13. A method as claimed in claim 12, wherein the undercut volume is defined by an inside surface of the side wall and an underside surface of the undercut of the side wall, which is extending away from the side wall.

14. A method as claimed in claim 12, wherein the first part includes one or more guide portions configured to enable the first part to be positioned in an injection molding apparatus at a predetermined position and receive the second part.

15. A method as claimed in claim 14, wherein the one or more guide portions comprise guide apertures for enabling the first part to be positioned in the injection molding apparatus at the predetermined position.

16. A method as claimed in claim 12, wherein the first part and the second part comprise different materials.

17. A method as claimed in claim 12, wherein the first part is configured to define an exterior surface of an electronic device, and the second part is configured to define an interior surface of the electronic device.

18. A method as claimed in claim 12, wherein the protrusion is configured to receive a fastener or is a reinforcement member.

19. An apparatus as claimed in claim 1, wherein the gap between the side wall and the protrusion extends from the top end of the side wall.

20. An apparatus as claimed in claim 1, wherein the second part is at an opposite end of the first part from the undercut of the side wall of the first part.

21. A method as claimed in claim 12, wherein the gap between the side wall and the protrusion extends from the top end of the side wall.

22. A front cover for a portable electronic device produced by a process comprising:
  forming a first part with a mold cavity and a mold core with a slider, the first part including a front wall portion, a side wall and a undercut of the side wall, the front wall portion extending away from a top end of the side wall at a pre-defined angle so as to define an aperture in the top side of the first part, the front wall portion also defining a plurality of thicker and thinner sections along at least two sides of the aperture, the front wall portion also comprising one or more guide portions configured to protrude beyond other portions of the front wall portion so as to extend into the aperture and to enable the first part to be positioned in an injection molding apparatus at a predetermined position and receive a second part, the undercut of the side wall extending away from a bottom end of the side wall at another angle, the side wall and the undercut of the side wall define an undercut volume molded by the slider movable in a horizontal direction to and from the side wall; and
  forming the second part molded to the first part with another mold core, the second part including a protrusion adjacent to the side wall and defining a gap between the protrusion and the side wall, the protrusion at least partially obstructing the horizontal movement of the slider that molds the undercut volume.

23. A front cover as claimed in claim 22, wherein the first part and the second part comprise different materials.

* * * * *